(12) United States Patent  
Brees et al.

(10) Patent No.: US 8,739,524 B2
(45) Date of Patent: Jun. 3, 2014

(54) TORQUE CONVERTER PUMP HUB WITH PROFILED ASSEMBLY SURFACE

(75) Inventors: William Brees, Bay Village, OH (US); Philip George, Wooster, OH (US); Michael Van Sickle, Akron, OH (US); Edward Pasho, Smithville, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 834 days.

(21) Appl. No.: 12/973,273

(22) Filed: Dec. 20, 2010

(65) Prior Publication Data

US 2011/0154813 A1   Jun. 30, 2011

Related U.S. Application Data

(60) Provisional application No. 61/290,355, filed on Dec. 28, 2009.

(51) Int. Cl.
  *F16D 33/00*  (2006.01)
(52) U.S. Cl.
  USPC ............................................ 60/364; 60/330
(58) Field of Classification Search
  USPC ............................ 60/330, 364, 366; 29/889.5
  See application file for complete search history.

(56) References Cited

U.S. PATENT DOCUMENTS

| 3,166,018 A | 1/1965 | Stedman, Jr. |
| 4,059,365 A | 11/1977 | Ivey et al. |
| 5,980,208 A | 11/1999 | Szuba |
| 7,017,340 B2 * | 3/2006 | Chicky ............................ 60/330 |
| 7,290,987 B1 * | 11/2007 | Morin ............................ 60/330 |
| 7,351,046 B2 | 4/2008 | Agner |
| 7,637,100 B2 * | 12/2009 | Uozumi et al. ................. 60/330 |
| 2007/0292269 A1 | 12/2007 | Uozumi et al. |
| 2011/0150670 A1 * | 6/2011 | Brees et al. .................... 417/214 |

* cited by examiner

*Primary Examiner* — Michael Leslie
(74) *Attorney, Agent, or Firm* — Simpson & Simpson, PLLC

(57) ABSTRACT

A torque converter including a cover, a turbine pump in fluid contact with the turbine, and a pump shell connected to the cover. The torque converter includes a pump hub connected to the pump shell such that the pump shell and the pump hub are fixed with respect to rotation. The pump hub also includes a portion with a distal end having a plurality of indentations and a plurality of sloped surfaces in contact with the plurality of indentations. The plurality of sloped surfaces is arranged to receive a plurality of protrusions for a transmission pump gear and to urge the pump hub or the pump gear into rotational motion to urge the plurality of protrusions into mating engagement with the plurality of indentations.

17 Claims, 7 Drawing Sheets

_US 8,739,524 B2_

TORQUE CONVERTER PUMP HUB WITH PROFILED ASSEMBLY SURFACE

CROSS-REFERENCE TO RELATED APPLICATIONS

This application claims the benefit under 35 U.S.C. §119 (e) of U.S. Provisional Application No. 61/290,355, filed Dec. 28, 2009, which application is incorporated herein by reference.

FIELD OF THE INVENTION

The disclosure relates to the assembly of a torque converter onto a transmission, specifically, the engagement between the torque converter pump hub and the transmission pump gear, even more specifically, to a profiled assembly surface for a pump hub to aid assembly.

BACKGROUND OF THE INVENTION

The current design for torque converter pump hubs and transmission pump gears reduces the initial probability of properly engaging the hub with the transmission pump gear. For example, the probability of positioning slots and tabs for a hub and gear within the small window of angles in which the parts are properly aligned for assembly is small. Further, repositioning the hub or pump to attain proper alignment is difficult because friction between a pump hub and a transmission prevents relative rotation of the hub and gear. Therefore, there have been a large percentage of parts that fail to assemble within the time allowed for assembly at the transmission assembly plant. After multiple failed attempts, the parts must be re-assembled manually at a second station.

BRIEF SUMMARY OF THE INVENTION

The present disclosure broadly comprises a torque converter including a cover, a turbine pump in fluid contact with the turbine, and a pump shell connected to the cover. The torque converter includes a pump hub connected to the pump shell such that the pump shell and the pump hub are fixed with respect to rotation. The pump hub includes a portion with a distal end having a plurality of indentations and a plurality of sloped surfaces in contact with the plurality of indentations. The plurality of sloped surfaces are arranged to receive a plurality of protrusions for a transmission pump gear and to urge the pump hub or the pump gear into rotational motion to urge the plurality of protrusions into mating engagement with the plurality of indentations. In one embodiment, the pump hub has a substantially cylindrical shape.

In one embodiment, the portion includes a radially outwardly facing surface in which the plurality of indentations and the plurality of sloped surfaces are formed. In one embodiment, the plurality of indentations and the plurality of sloped surfaces are formed of a single piece of material in the radially outwardly facing surface. In one embodiment, the plurality of indentations and the plurality of sloped surfaces are integral to the radially outwardly facing surface.

In one embodiment, the pluralities of indentations and sloped surfaces are symmetrically arranged. In one embodiment, each indentation from the plurality of indentations includes a respective substantially flat axial surface. The pluralities of sloped surfaces are in contact with the distal end. In one embodiment, each sloped surface from the plurality of sloped surfaces is sloped from the distal end to a respective indention and from the radially outwardly facing surface to the respective indentation. In one embodiment, adjacent pairs of sloped surfaces from the plurality of sloped surfaces are connected.

In one embodiment, the distal end includes a radial surface and the plurality of indentations and the plurality of sloped surfaces extend from the radial surface. In one embodiment, each indentation from the plurality of indentations includes a respective substantially flat radial surface. In one embodiment, the distal end includes a radial surface from which the plurality of indentations and the plurality of sloped surfaces extend and each sloped surface from the plurality of sloped surfaces is sloped from the radial surface to a respective indention.

The present disclosure further broadly comprises a torque converter including a cover, a turbine, a pump in fluid communication with the turbine, a pump shell fixedly connected to the cover, and a pump hub connected to the pump shell such that the pump shell and the pump hub are fixed with respect to rotation. The pump hub includes an outer circumferential surface in communication with a distal end of the pump hub. A plurality of flattened segments and a plurality of sloped surfaces are disposed in the outer circumferential surface and each flattened segment is in communication with a respective pair of sloped surfaces. The sloped surfaces are arranged to receive a plurality of protrusions for a transmission pump gear and to urge the pump hub or the pump gear into rotational motion to urge the plurality of protrusions into mating engagement with the plurality of flattened segments. The plurality of flattened segments is symmetrically arranged and each sloped surface is sloped from the circumferential surface to a respective flattened segment and from a respective flattened segment to the distal end.

The present disclosure broadly comprises a torque converter with a cover, a turbine, and a pump in fluid contact with the turbine. The torque converter also includes a pump shell fixedly connected to the cover and a pump hub connected to the pump shell such that the pump shell and the pump hub are fixed with respect to rotation. The pump hub includes a radial surface at a distal end of the pump hub. A plurality of indentations and a plurality of sloped surfaces extend from the radial surface. Each indentation is in contact with a respective pair of sloped surfaces, and the sloped surfaces are arranged to receive a plurality of protrusions for a transmission pump gear and to urge the pump hub or the pump gear into rotational motion to urge the plurality of protrusions into mating engagement with the plurality of indentations. In one embodiment, the plurality of indentations is symmetrically arranged. In one embodiment, each sloped surface from the plurality of sloped surfaces is sloped from the radial surface for the distal end to a respective indention.

It is a general object of the present disclosure to provide a profiled assembly surface for a pump hub that enables relative motion between the pump hub and a transmission pump gear during assembly.

These and other objects and advantages of the present disclosure will be readily appreciable from the following description of preferred embodiments of the disclosure and from the accompanying drawings and claims.

BRIEF DESCRIPTION OF THE DRAWINGS

The nature and mode of operation of the present disclosure will now be more fully described in the following detailed description of the disclosure taken with the accompanying drawing figures, in which.

DETAILED DESCRIPTION OF THE INVENTION

At the outset, it should be appreciated that like drawing numbers on different drawing views identify identical, or functionally similar, structural elements of the disclosure. While the present disclosure is described with respect to what is presently considered to be the preferred aspects, it is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure, which is limited only by the appended claims.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the preferred methods, devices, and materials are now described.

Figure 1A:
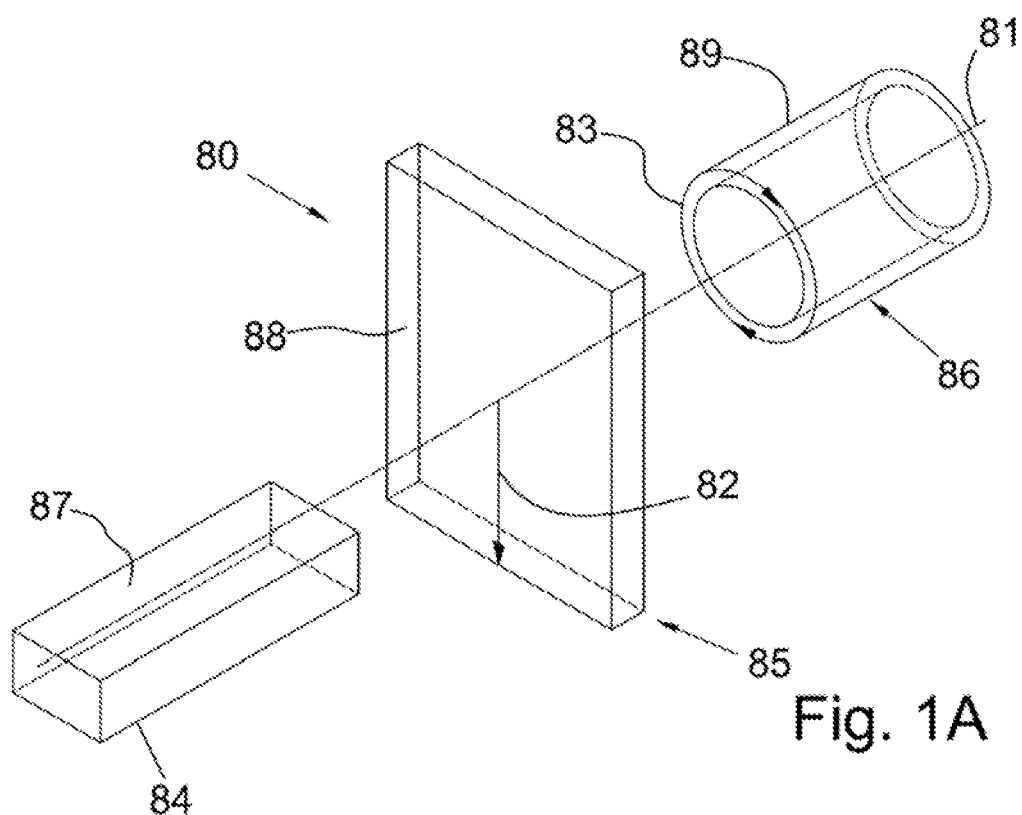
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present disclosure is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
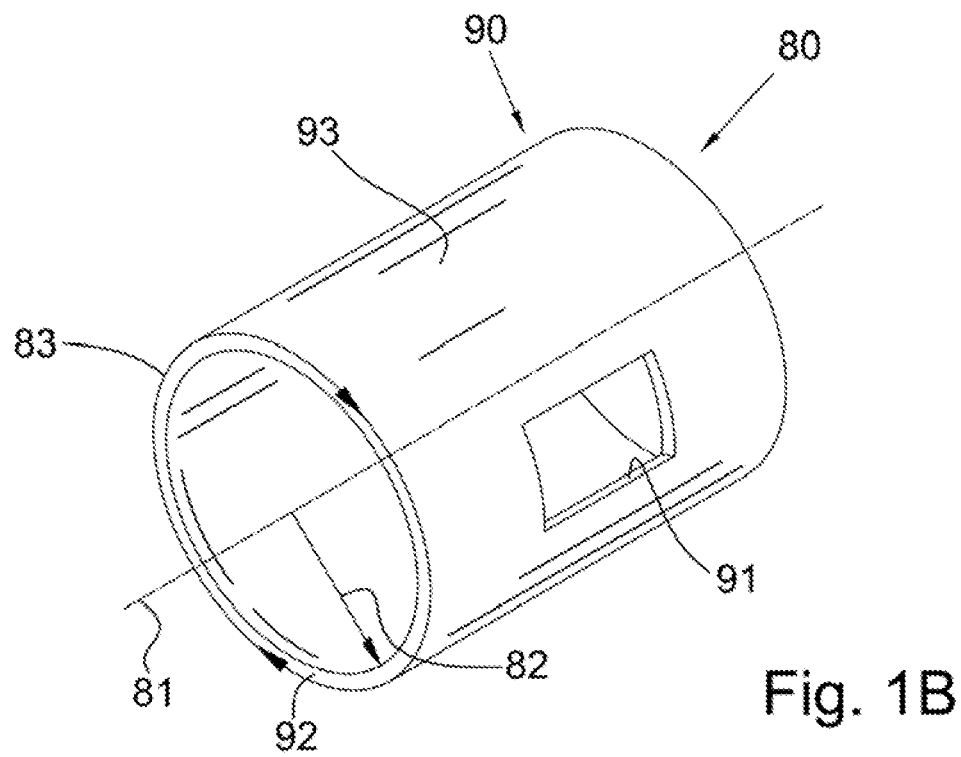
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present disclosure in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
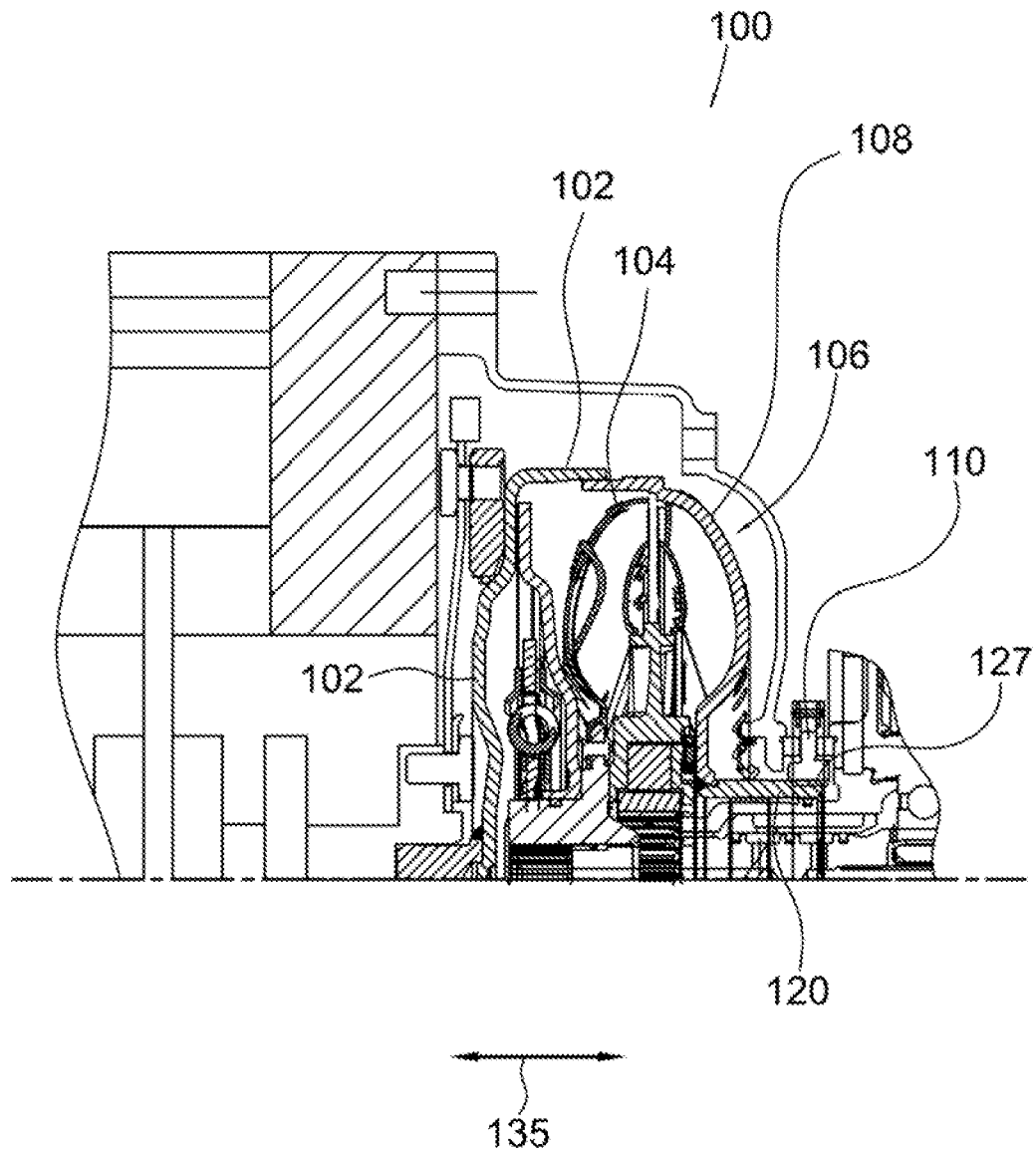
FIG. 2 is a partial cross-sectional view of a torque converter with a pump hub having sloped surfaces.

FIG. 2 is a partial cross-sectional view of torque converter 100 with a pump hub having sloped surfaces. Torque converter 100 includes cover 102, turbine 104 and pump 106 in fluid contact with turbine 104. Pump shell 108 is connected to cover 102. Torque converter 100 also includes pump hub 120 connected to pump shell 108 such that pump shell 108 and pump hub 120 are fixed with respect to rotation.

Figure 3:
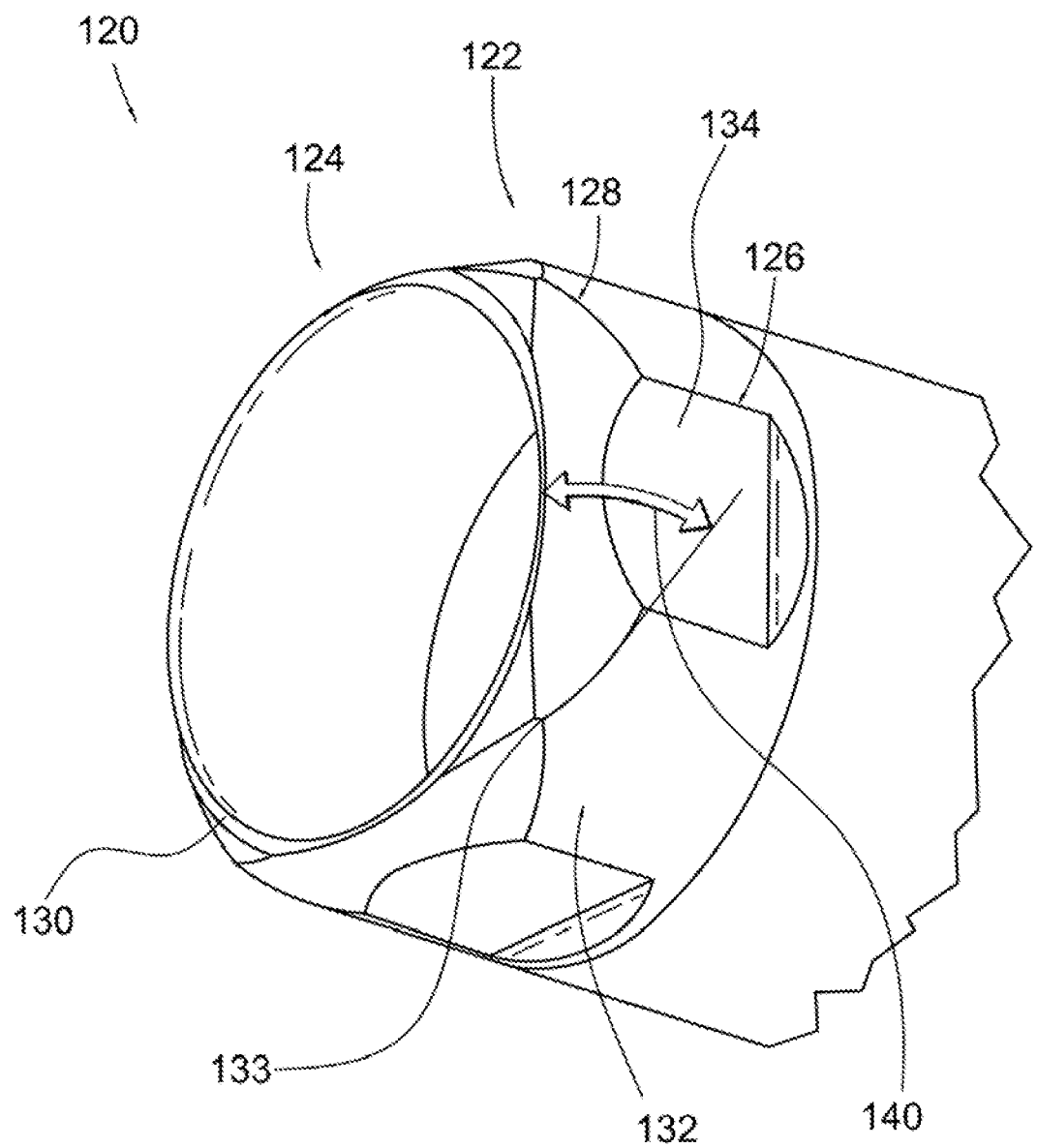
FIG. 3 is a perspective view of the pump hub shown in FIG. 2.

FIG. 3 is a perspective view of the pump hub shown in FIG. 2.

Figure 4:
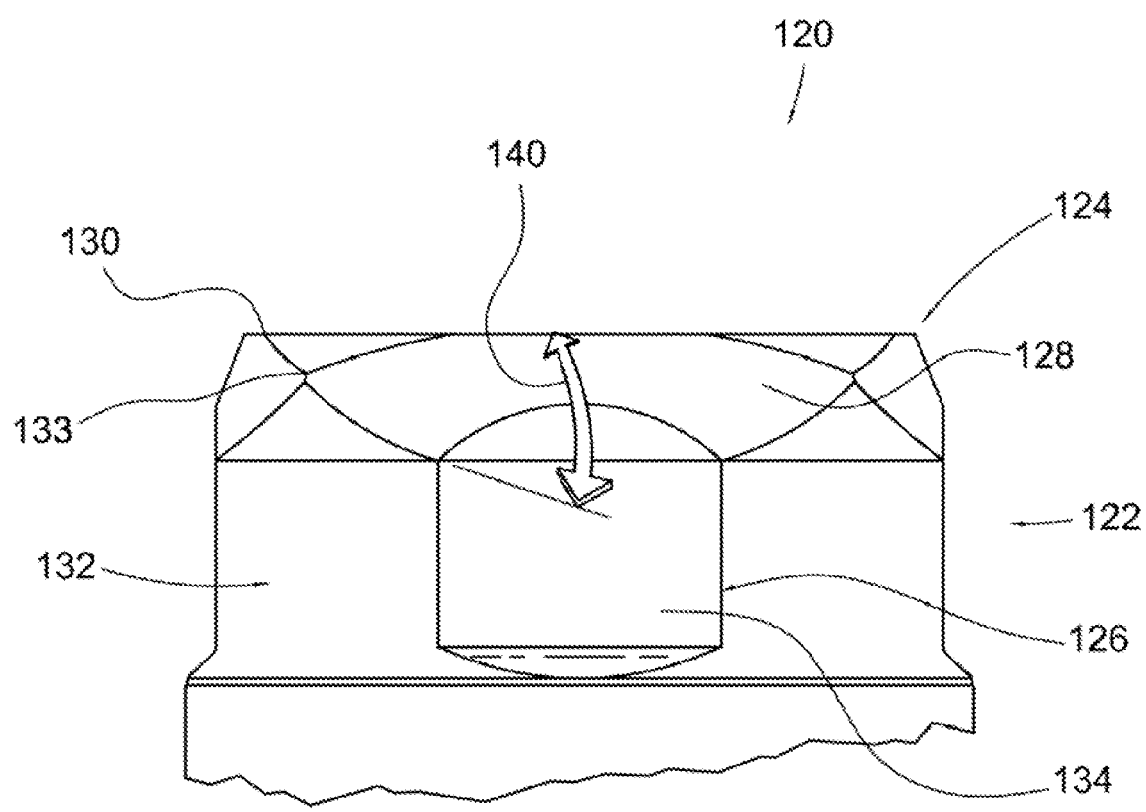
FIG. 4 is a side view of the pump hub shown in FIG. 2.

FIG. 4 is a side view of the pump hub shown in FIG. 2.

Figure 5:
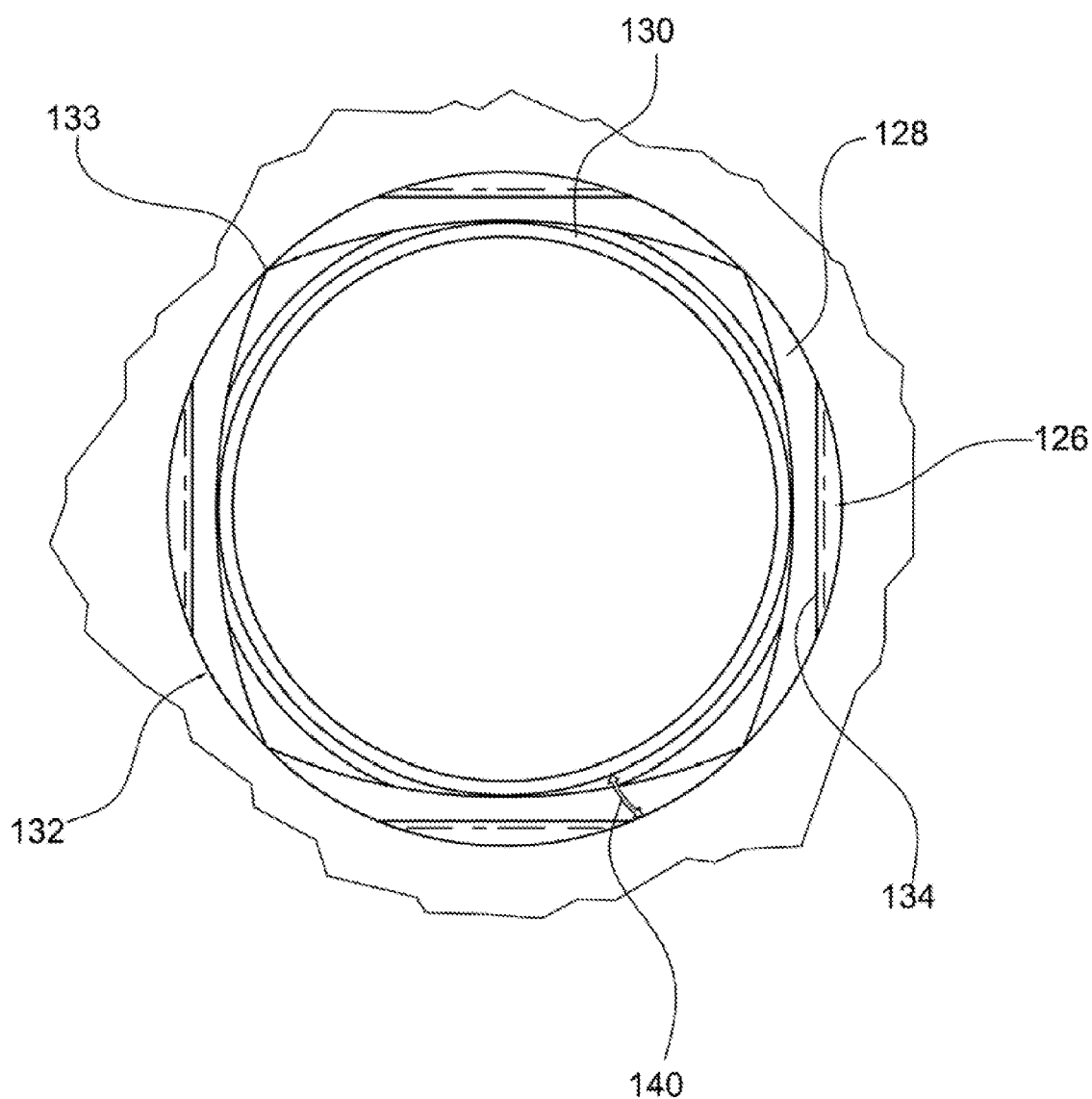
FIG. 5 is a top view of the pump hub shown in FIG. 2.

FIG. 5 is a back view of the pump hub shown in FIG. 2. The following should be viewed in light of FIGS. 1 through 5. Pump hub 120 also includes portion 122 with distal end 124. Portion 122 includes plurality of indentations 126 and plurality of sloped surfaces 128 in communication with plurality of indentations 126. Plurality of sloped surfaces 128 is arranged to receive plurality of protrusions 127 for transmission pump gear 110 to urge pump hub 120 or the pump gear into rotational motion to urge plurality of protrusions 127 into mating engagement with plurality of indentations 126.

The present disclosure improves the installation process between torque converter pump hub 120 and transmission pump gear 110. The assembly of the torque converter onto a transmission can be performed by manual labor or by robotic automation. Typically in assembly plants, robotic automation is used because of its efficiency. During the installation process, each protrusion from the plurality of protrusions 127 on transmission pump gear 110 is to be engaged with a corresponding indentation from plurality of indentations 126 of pump hub. Pump hub 120 has a substantially cylindrical shape and in one embodiment, plurality of indentations 126 are symmetrically arranged to correspond to the configuration of plurality of protrusions 127 on transmission pump gear 110. In one embodiment, each indentation 126 from the plurality of indentations includes a respective substantially flat axial surface, or flattened segment, 134. Although a particular shape and configuration is shown for indentations 126, it should be readily obvious to those of ordinary skill in the art that other shapes and configurations for indentations 126 are possible. It should also be readily obvious to those of ordinary skill in the art that protrusion 127 may be a tab and may have a number of many different configurations, such as for example, a projection, a tooth and the like.

Portion 122 includes radially outwardly facing surface, or outer circumferential surface, 132 which includes plurality of indentations 126 and plurality of sloped surfaces 128. Alternately stated, plurality of indentations 126 and plurality of sloped surfaces 128 are formed of a single piece of material in surface 132. That is, plurality of indentations 126 and plurality of sloped surfaces 128 are integral to radially outwardly facing surface 132. It should also be readily obvious to those of ordinary skill in the art that sloped surfaces 128 may be a chamfer, and may include a variety of configurations, such as for example, a leading edge, a beveled edge and the like.

During assembly of the pump hub and the pump gear, the indentations and the protrusions may not be sufficiently aligned, meaning that at least portions of the protrusions contact the sloped surfaces. Advantageously, plurality of sloped surfaces 128 enable relative rotation between pump hub 120 and transmission pump gear 110 to bring the indentations and protrusions into alignment. For example, surfaces 128 are sloped from connection points 133, between adjacent surfaces, to the protrusions, and from the protrusions to radial surface 130, such that force exerted on the pump hub or the pump gear in axial direction 135 causes relative rotation of the pump hub and gear to enable the protrusions to slide along the sloped surfaces toward and into the indentations. For example, compound angle 140 in the sloped surfaces is selected such that the force needed to rotate the pump gear is more than the combined friction between protrusions and the sloped surfaces and between the pump gear and the transmission.

Figure 6:
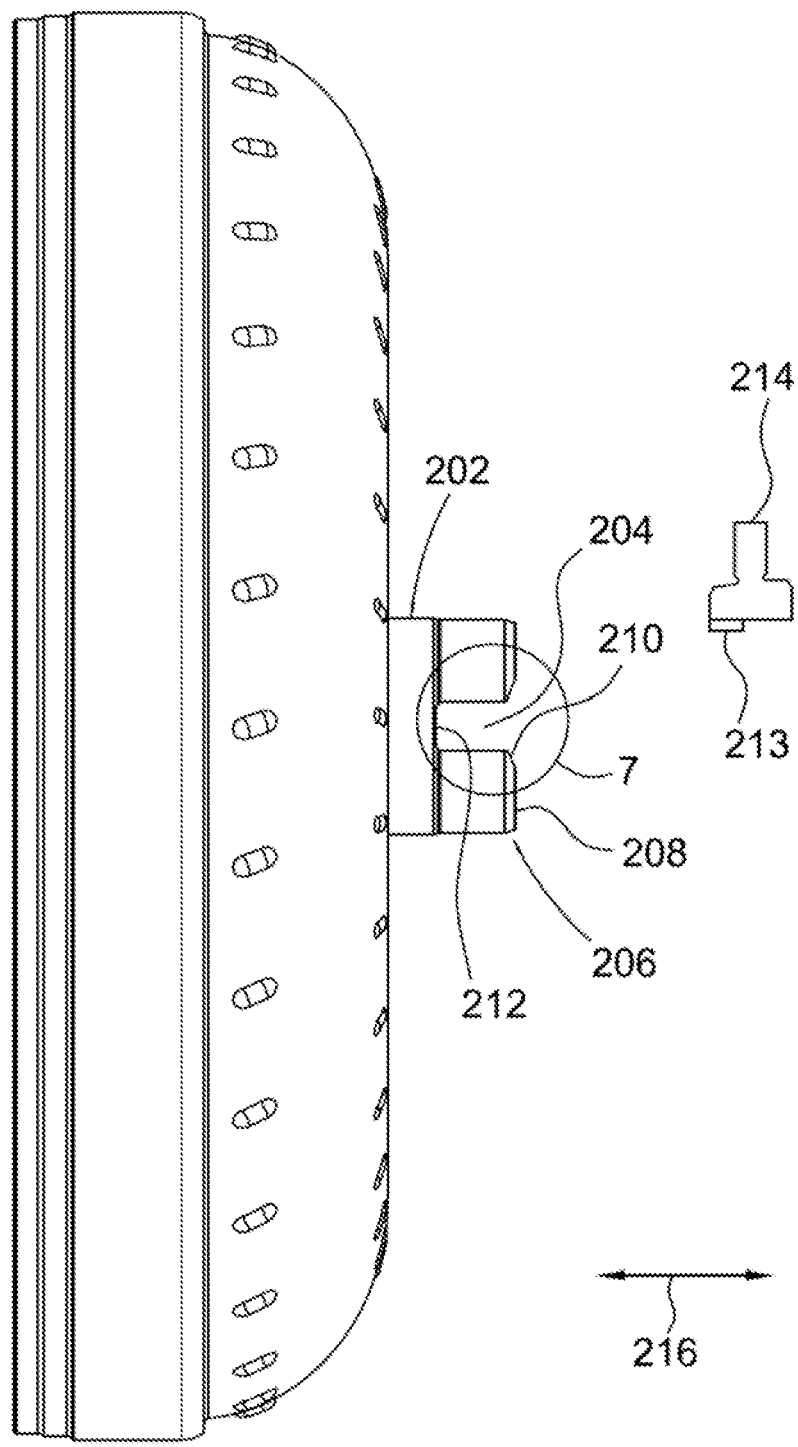
FIG. 6 is a side view of a pump shell and a pump hub having indentations in a distal end; and, FIG. 7 is a detail of area 7 shown in FIG. 6.

FIG. 6 is a side view of pump shell 108 and pump hub 202 having indentations 204 in distal end 206.

Figure 7:
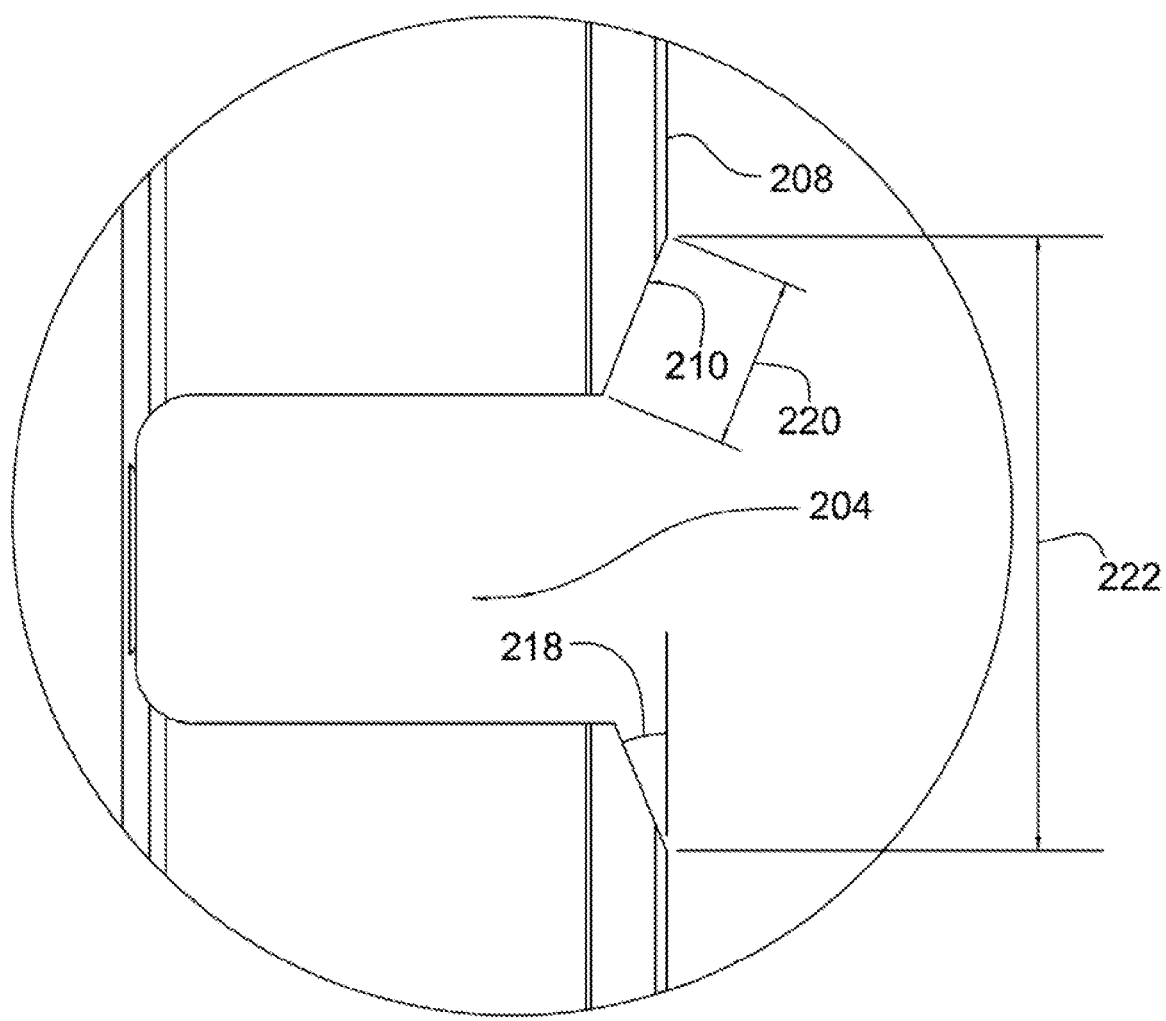

FIG. 7 is a detail of area 7 shown in FIG. 6. The following should be viewed in light of FIGS. 6 and 7. Distal end 206 includes radial surface 208, plurality of indentations 204, and plurality of sloped surfaces 210 extending from the radial surface. Each indentation 204 includes a respective radial surface 212. Each sloped surface 210 is sloped from radial surface 208 to a respective indention 204. Sloped surfaces 210 are arranged to receive plurality of protrusions 213 for transmission pump gear 214 and to urge pump hub 202 and the pump gear into relative rotational motion to urge plurality of protrusions 213 into mating engagement with plurality of indentations 204.

In one embodiment, indentations 204 are symmetrically arranged with respect to each other. For example, two indentations formed on the hub would be arranged at about 180 degrees apart, three indentations formed on the hub would be arranged at about 120 degrees apart, four indentations formed on the hub would be arranged at about 90 degrees apart.

During assembly, relative motion occurs between the pump hub and the pump gear which allows at least portions of the protrusions to contact the sloped surfaces instead of the indentations. If during assembly of the pump hub and the pump gear, protrusions 213 contact surface 208 and protrusions 213 do not engage indentations 204, the pump hub or the pump gear are rotated so that protrusions 213 contact sloped surfaces 210. Advantageously, plurality of sloped surfaces 210 enable relative rotation between pump hub 202 and transmission pump gear 214 to bring the indentations and protrusions into alignment. For example, surfaces 210 are sloped from surface 208 to the protrusions, such that force exerted on the pump hub or the pump gear in axial direction 216 causes relative rotation of the pump hub and gear to enable the protrusions to slide along the sloped surfaces toward and into the indentations. That is, angle 218, and hence length 220, for the sloped surfaces is sufficient to enable the protrusions to overcome the friction between the pump hub and the pump gear and between the gear and the transmission to cause the protrusions to slide along the sloped surfaces.

During typical installation of pump hub 202 and transmission pump gear 214, a typical pump hub, for example, with a standard rounded or angled corner, the width for an indentation in which a gear protrusion can successfully engage the indentation is about 4 degrees along the circumference of the pump hub. That is, with a relative offset of 4 degrees, the pump hub and the pump gear can still be engaged. As a result, there is a 2.2% chance that the torque converter or the gear pump would be sufficiently aligned at the start of an installation process. For hub 202, width 222 can be about four mm or about 22 degrees along the circumference of the pump hub. That is, with a relative offset of 22 degrees, the pump hub and the pump gear can still be engaged. Thus, there is a 12.2% chance of proper engagement for installation of the pump hub and the pump gear at the start of an installation process.

Specifically, angle 218 can be chosen so that, within a dry or lubricated system, the protrusions slide on surfaces 208, causing rotation between the pump hub and the transmission pump gear, in response to the force used for installation, for example, force in direction 216. In an example embodiment, with W equal to 167N (with respect to the weight of a torque converter pushing on the pump hub) and with a standard wet lubricated system for pump hub 202, angle 218 can be as low as seven degrees. In an example embodiment, with W equal to 167N and with a standard dry lubricated system for hub 202, angle 218 can be as low as 22 degrees. Note that is W is sufficiently increased; the respective angles can be subsequently decreased.

The controlling equation is:

$$Fr = W^*\sin\alpha - (W^*\mu^*\cos\alpha) - ((W^*\mu^*\cos\alpha^*\mu^*\sin\alpha) + (P^*\mu))$$

Where:
Fr=Force available for rotation
W=Force (weight) applied by torque converter in the axial direction
α=The slope for the sloped surfaces (angle 218)
μ=Friction coefficient
P=Weight of the transmission pump gear Thus, it is seen that the objects of the present disclosure are efficiently obtained, although modifications and changes to the disclosure should be readily apparent to those having ordinary skill in the art, which modifications are intended to be within the spirit and scope of the disclosure as claimed. It also is understood that the foregoing description is illustrative of the present disclosure and should not be considered as limiting. Therefore, other embodiments of the present disclosure are possible without departing from the spirit and scope of the present disclosure.

What we claim is:

1. A torque converter, comprising:
   a cover;
   a turbine;
   a pump in fluid communication with the turbine and including a pump shell fixedly connected to the cover; and,
   a pump hub connected to the pump shell such that the pump shell and the pump hub are fixed with respect to rotation, the pump hub including a portion, the portion including:
      a distal end of the pump hub;
      a plurality of indentations; and,
      a plurality of sloped surfaces in communication with the plurality of indentations, wherein the plurality of sloped surfaces are arranged to receive a plurality of protrusions for a transmission pump gear and to urge the pump hub or the pump gear into rotational motion to urge the plurality of protrusions into mating engagement with the plurality of indentations.

2. The torque converter of claim 1 wherein the pump hub has a substantially cylindrical shape.

3. The torque converter of claim 1 wherein:
   the portion includes a radially outwardly facing surface; and,
   the plurality of indentations and the plurality of sloped surfaces are formed in the radially outwardly facing surface.

4. The torque converter of claim 1 wherein the plurality of indentations are symmetrically arranged; and, the plurality of sloped surfaces are symmetrically arranged.

5. The torque converter of claim 1 wherein each indentation from the plurality of indentations includes a respective substantially flat axial surface.

6. The torque converter of claim 1 wherein the plurality of sloped surfaces are in communication with the distal end.

7. The torque converter of claim 1 wherein:
the portion includes a radially outwardly facing surface;
each sloped surface from the plurality of sloped surfaces is sloped from the distal end to a respective indention; and,
each sloped surface from the plurality of sloped surfaces is sloped circumferentially from the radially outwardly facing surface to the respective indentation.

8. The torque converter of claim 1 wherein adjacent pairs of sloped surfaces from the plurality of sloped surfaces are connected.

9. The torque converter of claim 1 wherein:
the distal end includes a radial surface; and,
the plurality of indentations and the plurality of sloped surfaces extend from the radial surface.

10. The torque converter of claim 9 wherein each indentation from the plurality of indentations includes a respective substantially flat radial surface.

11. The torque converter of claim 1 wherein:
the distal end includes a radial surface;
the plurality of indentations and the plurality of sloped surfaces extend from the radial surface; and,
each sloped surface from the plurality of sloped surfaces is sloped from the radial surface to a respective indention.

12. A torque converter, comprising:
a cover;
a turbine;
a pump in fluid communication with the turbine and including a pump shell fixedly connected to the cover;
a pump hub connected to the pump shell such that the pump shell and the pump hub are fixed with respect to rotation, the pump hub including an outer circumferential surface in communication with a distal end of the pump hub; and,
a plurality of flattened segments and a plurality of sloped surfaces disposed in the outer circumferential surface, wherein:
each flattened segment is in communication with a respective pair of sloped surfaces; and,
the sloped surfaces are arranged to receive a plurality of protrusions for a transmission pump gear and to urge the pump hub or the pump gear into rotational motion to urge the plurality of protrusions into mating engagement with the plurality of flattened segments.

13. The torque converter of claim 12 wherein the plurality of flattened segments are symmetrically arranged.

14. The torque converter of claim 12 wherein each sloped surface is sloped from the circumferential surface to a respective flattened segment and from a respective flattened segment to the distal end.

15. An assembly for a torque converter, comprising:
a pump shell;
a pump hub connected to the pump shell such that the pump shell and the pump hub are fixed with respect to rotation, the pump hub including a radial surface at a distal end of the pump hub; and,
a plurality of indentations and a plurality of sloped surfaces extending from the radial surface, wherein:
each indentation is in communication with a respective pair of sloped surfaces; and,
the sloped surfaces are arranged to receive a plurality of protrusions for a transmission pump gear and to urge the pump hub and the pump gear into relative rotational motion to urge the plurality of protrusions into mating engagement with the plurality of indentations.

16. The torque converter of claim 15 wherein the plurality of indentations are symmetrically arranged.

17. The torque converter of claim 15 wherein each sloped surface from the plurality of sloped surfaces is sloped from the radial surface for the distal end to a respective indention.

* * * * *